US009811106B2

(12) United States Patent
Paglino et al.

(10) Patent No.: US 9,811,106 B2
(45) Date of Patent: Nov. 7, 2017

(54) REFERENCE CIRCUIT ARRANGEMENT AND METHOD FOR GENERATING A REFERENCE VOLTAGE

(71) Applicant: ams AG, Unterpremstaetten (AT)

(72) Inventors: Lorenzo Paglino, Zinasco (IT); Simone Verri, San Martino Siccomario (IT)

(73) Assignee: AMS AG, Unterpremstaetten (AT)

( * ) Notice: Subject to any disclaimer, the term of this patent is extended or adjusted under 35 U.S.C. 154(b) by 0 days.

(21) Appl. No.: 15/098,211

(22) Filed: Apr. 13, 2016

(65) Prior Publication Data

US 2016/0224052 A1 Aug. 4, 2016

Related U.S. Application Data

(63) Continuation of application No. 14/236,065, filed as application No. PCT/EP2012/064884 on Jul. 30, 2012, now Pat. No. 9,317,057.

(30) Foreign Application Priority Data

Aug. 3, 2011 (EP) .................................... 11176474

(51) Int. Cl.
*H02M 3/16* (2006.01)
*H02M 3/20* (2006.01)
(Continued)

(52) U.S. Cl.
CPC ................ *G05F 3/262* (2013.01); *G05F 3/16* (2013.01); *G05F 3/20* (2013.01); *G05F 3/26* (2013.01); *G05F 3/30* (2013.01)

(58) Field of Classification Search
CPC .................................... G05F 3/16; G05F 3/20
(Continued)

(56) References Cited

U.S. PATENT DOCUMENTS 5,629,611 A * 5/1997 McIntyre ............... G05F 3/267 323/313
8,446,140 B2 * 5/2013 Harvey ..................... G05F 3/30 323/311

(Continued)

FOREIGN PATENT DOCUMENTS

WO WO-2010/058250 A1 5/2010

OTHER PUBLICATIONS

Malcovati, Piero et al., "Curvature-Compensated BiCMOS Bandgap with 1-V Supply Voltage", IEEE Journal of Solid-State Circuits, vol. 36, No. 7, Jul. 2001, pp. 1076-1081.

*Primary Examiner* — Timothy J Dole
*Assistant Examiner* — Ishrat Jamali
(74) *Attorney, Agent, or Firm* — McDermott Will & Emery LLP

(57) ABSTRACT

A reference circuit arrangement comprises a branched current path connecting a first and second terminal via an intermediate terminal. The intermediate terminal is connected to a reference terminal. A current path is coupled between the first and second terminal via the reference terminal. A feedback loop is connected to the first and second terminal and designed to control, at the first and second terminal, a virtual ground potential. A reference path is connected to the feedback loop having a reference input for receiving from the feedback loop a reference current and reference output to provide a reference voltage.

13 Claims, 1 Drawing Sheet

(51) Int. Cl.
*G05F 3/26* (2006.01)
*G05F 3/16* (2006.01)
*G05F 3/20* (2006.01)
*G05F 3/30* (2006.01)

(58) Field of Classification Search
USPC .................................................. 323/313–316
See application file for complete search history.

(56) References Cited

U.S. PATENT DOCUMENTS

| | | | | |
|---|---|---|---|---|
| 2006/0208790 | A1* | 9/2006 | Tadeparthy | G05F 3/30 327/541 |
| 2007/0252573 | A1* | 11/2007 | Tachibana | G05F 3/30 323/313 |
| 2008/0001661 | A1 | 1/2008 | Tachibana et al. | |
| 2009/0066313 | A1* | 3/2009 | Kimura | G05F 3/262 323/313 |
| 2010/0188141 | A1 | 7/2010 | Aruga et al. | |

* cited by examiner

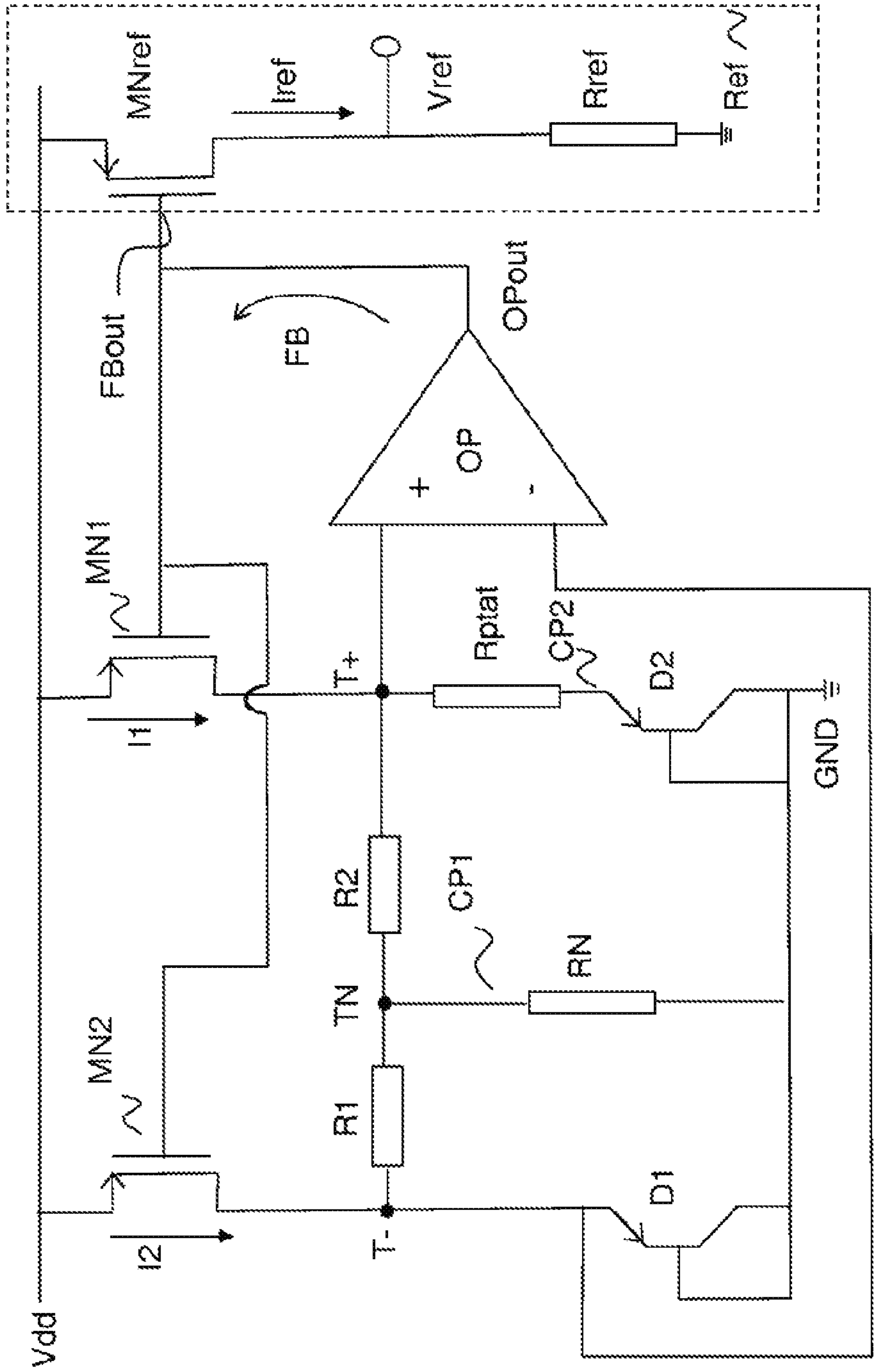
MNref
Iref
Vref
Rref
Ref
FBout
FB
OPout
OP
+
-
MN1
MN2
I1
I2
T+
TN
T-
Rptat
CP2
D2
GND
R2
CP1
RN
R1
D1
Vdd

REFERENCE CIRCUIT ARRANGEMENT AND METHOD FOR GENERATING A REFERENCE VOLTAGE

CROSS-REFERENCE TO RELATED APPLICATIONS

This application is a continuation application of U.S. patent application Ser. No. 14/236,065, filed May 9, 2014, which is the national stage of International Patent Application No. PCT/EP2012/064884, filed Jul. 30, 2012, which claims the benefit of priority under 35 U.S.C. §119 of European Patent Application No. 11176474.2 filed on Aug. 3, 2011, all of which are hereby incorporated by reference in their entirety for all purposes.

DESCRIPTION

The principles presented herein with relate to a reference circuit arrangement and to a method for generating a reference voltage.

BACKGROUND OF THE INVENTION

In modern low power applications there is an ongoing need for low bias current and low supply voltage. At the core of proposed solutions are bandgap circuits. Considering a conventional bandgap implemented in CMOS technology, however, voltage supply and output voltage reference generation is subject to a basic limitation. Usually a PTAT (proportional to absolute temperature) resistor and a diode characterized by a voltage Vbe provide two temperature dependent currents which are summed with a tailored weight to provide a reference voltage independent of temperature. The voltage Vbe of a diode decreases with temperature T which is compensated for by the contribution of the PTAT element. The sum of these two contributions is to a good approximation independent of temperature T if the PTAT contribution is equal to approximately 22·Vt, in which Vt denotes the thermal voltage. The resulting reference voltage depends only on silicon properties and is slightly more than 1.2 volts in common applications.

In this conventional approach the voltage is obtained from the sum of two contributions related to circuit elements connected in series. Therefore, it is not convenient to scale down to a lower supply by using further elements connected in parallel. In particular, it is difficult and not convenient to obtain a divided reference voltage simply by arranging a parallel resistor and taking intermediate taps. Other circuits have been proposed based on mismatched pairs of diodes and a current injection approach to overcome the supply limitation. Such bandgap circuits give some more flexibility to reduce the supply voltage but demand implementation of rather large resistors. These, however, demand large area in integration decreasing the overall size of an integrated circuit.

SUMMARY OF THE INVENTION

According to an aspect, a reference circuit arrangement comprises a branched current path connecting a first and second terminal via an intermediate terminal in which the intermediate terminal is connected to a reference terminal. In other words the branched current path constitutes a star- or Y-circuit. Another current path is coupled between the first and second terminal via the reference terminal. A feedback loop is connected to the first and second terminal. A reference path is connected to the feedback loop having a reference input for receiving from the feedback loop a reference current and a reference output to provide a reference voltage.

The feedback loop is designed to control, at the first and second terminal, a virtual ground potential. This way it is safe to have the branched current path connected to the reference terminal and no short circuit occurs.

The first and second current paths generate a first and second current, respectively. These first and second currents have a characteristic temperature dependency which can be chosen such as to compensate each other. The sum of first and second current, controlled by the feedback loop, may then be independent on temperature.

First and second currents may conveniently be scaled to required values. This allows for flexible reference generation, e.g. by summing as mentioned above. In particular, a temperature independent reference current may be derived which can be transformed into a temperature independent reference voltage. The branched structure of the first current path allows area saving implementation.

According to another, alternative embodiment the reference terminal is either connected with a supply voltage or, with a ground potential.

In another embodiment the branched current path provides the first current having a first temperature coefficient. Similarly, the second current path provides the second current having a second temperature coefficient. In an embodiment, however, the first temperature coefficient is negative and the second temperature coefficient is positive. Furthermore, the feedback loop is designed to provide the reference current depending on the sum of the first and second current. The reference path generates the reference voltage depending on the reference current.

In one embodiment, the first and second temperature coefficients are chosen such as to render the reference current, and consequently the reference voltage, independent from the ambient temperature.

In another embodiment the branched current path comprises a matched pair of a first and second resistor connecting, in series, the first and second terminal via the intermediate terminal. An intermediate resistor is matched to the pair of first and second resistor and is connected to the intermediate terminal and to the reference terminal.

Advantageously, by providing first and second terminal with the same potential the connection from the intermediate terminal to ground potential does not cause a short circuit. Therefore first, second and intermediate resistor can be matched. In particular, the intermediate resistor can have a rather small resistance as compared to the case when only first and second resistors were present. This allows for area saving implementation.

According to another embodiment the intermediate resistor is matched to the pair of resistors having a resistance depending on the resistance of the matched pair of resistors.

In another embodiment the resistance Rn of the intermediate resistor is given by $Rn=(N-1)/(2\times R1)$. N denotes an integer or real number strictly greater than 1 and R1, R2, denote the resistance of the first and second resistor, respectively. It is possible that first and second resistors are matched and have the same resistance value.

The resulting thermal drift will be independent of the temperature sensitivity of first, second and intermediate resistors and determine the final thermal coefficient of the voltage reference. In other words, the reference path has no impact on the resulting thermal drift and, thus, can be set to any convenient resistance to provide the reference voltage.

In another embodiment the second current path comprises a proportional to absolute temperature resistor coupled between the first and second terminal via a first reference element and a second reference element each connected to the reference terminal.

In one embodiment, first reference element and a second reference element have matched current densities. Thus, a voltage drop across the proportional to absolute temperature resistor is proportional to temperature.

According to another embodiment a mismatched pair of diodes comprises the first reference element and the second reference element. It is possible that first and second diodes have different current densities characterised by different areas.

According to another embodiment the feedback loop comprises an operational amplifier connected via its non-inverting and inverting input to the first and second terminal, respectively. The first and second transistor are coupled with their load sides to a supply terminal and connected to the non-inverting and inverting input of the operational amplifier, respectively. The feedback output is connected to the respective control side of the first and second transistor. It is also connected to an output of the operational amplifier and connected to the reference path.

The operational amplifier forces potentials at the first and second terminal to be equal. Thus, nominally equal first and second resistors produce a current proportional to the voltage drop as defined by the reference elements, or, in more detail, diode voltage drop across the first and second diodes.

In another embodiment the number N depends on the offset of the operational amplifier.

The operational amplifier may have an offset. This can be accounted for by setting the resistances of first and second resistors to an appropriate value and fit the resistance of the intermediate resistor accordingly. Monte Carlo simulations are of great help to determine a reasonable trade off between offset rejection and the amount of resistance with respect to intermediate resistor.

The choice of number N is derived as a trade off between area reduction due to possibly smaller resistance values and offset sensitivity of the operational amplifier. N reduces area by an amount proportional to (0.25+0.75/N) %. While larger values of number N reduce the voltage drop across first and second resistors the offset influence rises. This is why it is convenient to conduct several Monte Carlo analyses to find a good trade of for N value.

In another embodiment the reference path comprises the reference transistor which is connected, via its control side, to the feedback output. The reference transistor is further connected, via its load side, between the supply terminal, the reference output and the reference transistor connected to the reference terminal.

It is possible that the reference resistor is matched to first and second resistor. This way the reference resistor changes in the same way the weight of both opposite thermal contributions from first and second current and the output reference voltage can be freely set by the choice of reference resistor. The final thermal coefficient for the obtained reference voltage is not altered by the choice of reference resistor. Thus, the proposed circuit allows for generating the reference voltage within a flexible range utilizing an area saving design. The implementation based on sharing first and second resistors terminated between first and second terminals and reference terminal via intermediate resistor allows the same reference voltage and the same power consumption even if using small resistors.

According to an aspect a method for generating a reference voltage comprises the step of providing a first current from a branched current path connecting a first and second terminal via an intermediate terminal. In other words the branched current path constitutes a star- or Y-circuit. The intermediate terminal is connected to a reference terminal. Furthermore, the second current is provided from a second current path coupled in between the first and second terminal via the reference terminal. Using a feedback loop a virtual ground potential is controlled at the first and second terminal. Finally, a reference voltage depending on the first and second current is generated.

First and second currents may conveniently be scaled to required values. This allows for flexible reference voltage generation, e.g. by summing the currents using the feedback loop. In particular, a temperature independent reference current may be derived which can be transformed into a temperature independent reference voltage. The branched structure of the first current path allows area saving implementation.

According to another, alternative embodiment the current path is coupled between the first and second terminal via a supply terminal.

According to another aspect a first current is provided with a first temperature coefficient and a second current is provided with a second temperature coefficient. First and second currents are summed using the feedback loop and, in the following, the reference voltage is generated from a reference current corresponding to the sum of the first and second current. Conveniently, the first and second temperature coefficients may have opposed signs.

According to another aspect the method further comprises setting the first temperature coefficient and the second temperature coefficient such as to render the reference current independent from the ambient temperature.

BRIEF DESCRIPTION OF THE DRAWINGS

The text below explains further details using an exemplary embodiment with references to FIG. 1.

FIG. 1 shows a first embodiment of a reference circuit arrangement according to the present principle.

Like reference numerals designate corresponding similar parts or elements.

DETAILED DESCRIPTION

FIG. 1 shows a first embodiment of a reference circuit arrangement according to the present principle. The circuit is based on a first and second current path CP1, CP2. The first current CP1 path is branched, i.e. a first and second terminal T+, T− are connected via a first and second resistor R1, R2. The first and second resistors R1, R2 are connected via an intermediate terminal TN. This intermediate terminal TN is connected to a reference terminal GND, connected to ground, via an intermediate resistor RN. First and second resistors R1, R2 are matched such that the resistance of resistors R1, R2 determine the resistance of the intermediate resistor RN. The resistance $R_n$ of the intermediate resistor RN is given by $$R_n = \frac{(N-1)}{2}R_1 = \frac{(N-1)}{2}R_2,$$

in which N is an integer or real number strictly greater than 1 and $R_1$, $R_2$ denote the resistance of the first and second resistor R1, R2, respectively.

The second current path CP2 comprises a first and second diode D1, D2 as reference elements and a proportional-to-absolute-temperature (PTAT) resistor Rptat. The diodes have mismatched current densities. The first terminal T+ is connected to the reference terminal GND via the PTAT resistor Rptat and the first diode D2. The second terminal T− is connected to the reference terminal GND via the second diode D1.

A feedback loop FB comprises an operational amplifier OP. A non-inverting and an inverting input +, − of the operational amplifier OP are connected to the first and a second terminal T+, T−, respectively. The first and second terminal T+, T− as well as the inverting and non-inverting inputs +, − of the operational amplifier OP are connected to a current mirror established from a first and second transistor MN1, MN2. Both first and second transistors MN1, MN2 are gate-connected and connected to an output FBout of the feedback loop FB. An output OPout of the operational amplifier OP is also connected to the output FBout of the feedback loop FB. Both first and second transistors MN1, MN2 are coupled to a supply terminal Vdd.

A reference circuit REF is connected to the output FBout of the feedback loop FB. This circuit comprises a reference transistor MNRef and a reference resistor Rref. The reference transistor MNRef is gate-connected to the two transistors MN1, MN2 of the current mirror via the output FBout. Along its load side the reference transistor MNRef is connected between the supply terminal Vdd, a reference output REF and the reference resistor Rref connected to the reference terminal GND.

In one embodiment transistors used with the circuit are of MOSFET type and the circuit may be integrated as an integrated circuit.

The first and second current paths CP1, CP2 build up the reference voltage at the output Vref of the circuit. The first current path CP1 contributes a first current Icp1 characterized by the base-emitter voltages Vbe across the first and second diode D1, D2. The second current path CP2 contributes a second current Icp2 proportional to the absolute temperature T. First and second current Icp1, Icp2 may be adjusted such as to compensate their respective temperature dependence. In particular, the first current Icp1 has a negative temperature coefficient which accounts for the positive temperature coefficient of the second current Icp2. For example, if the thermal voltage $$V_T = \frac{k_B T}{q},$$

resulting from the second current Icp2 by means of the PTAT resistors Rptat is used it may be multiplied by a factor of 22 to render the sum of first and second current Icp1, Icp2 independent on temperature. The thermal voltage $V_T$ depends on Boltzmann's constant $k_B$, Temperature T, and the electron's charge q. Generally, the bandgap or reference voltage Vref results from $$V_{ref} = V_{be} + n \cdot \frac{k_B T}{q},$$

in which n denotes a scaling factor. If n=22, as mentioned above, the generated bandgap voltage or reference voltage Vref becomes approximately 1.2 V. In order to achieve fractions of this voltage the present principle provides means to suitably scale first and second current Icp1, Icp2.

The first current path CP1 provides the first current Icp1 proportional to voltage drop Vbe. In fact, due to the virtual ground of the operational amplifier OP, the voltages at first and second terminals T+, T− of both first and second resistors R1, R2 are basically the same and set to Vbe. Because of this relationship and for the sake of simplicity in the following the resistance of first and second resistors R1, R2 is set to be $R_{vbe}$/N in which $R_{vbe}$ denotes the resistance corresponding to a voltage drop equal to Vbe at first current Icp1. N is the number introduced above.

Applying Kirchhoff s current law at the intermediate terminal TN of first and second resistors R1, R2, a voltage Vc at intermediate terminal TN follows from $$2 \cdot \frac{V_{be} - V_c}{R_{vbe}/N} = \frac{V_c}{(N-1) \cdot R_{vbe}/2N}$$

which gives $$V_c = (N-1) \cdot \frac{V_{be}}{N}.$$

The above relationship allows expressing the first current Icp1 in each resistor R1, R2 as $$Icp1 = \frac{V_{be} - V_c}{R_{vbe}/N} = \frac{V_{be}/N}{R_{vbe}/N} = \frac{V_{be}}{R_{vbe}},$$

i.e. the first current Icp1 is proportional to diode voltage Vbe. As Vbe has a negative temperature coefficient, the first current Icp1 will share the same temperature characteristic (neglecting the drift associated with resistors R1, R2).

The second current path CP2 embodies a PTAT current generation, i.e. the voltage difference between first and second diodes D1, D2 is proportional to absolute temperature T and drops across resistor Rptat to generate the second current Icp2. Given A the ratio of current densities of first and second diode D1, D2, the current flowing across PTAT resistor Rptat is given by $$Icp2 = V_T \cdot \frac{\ln A}{R_{ptat}}.$$

The second current Icp2 increases with temperature T (neglecting, as a reasonable assumption, the drift of the PTAT resistor Rptat).

In addition, first and second diodes D1, D2 drain the same current thus ensuring the virtual ground of the operational amplifier OP is given by the diode's voltage drop Vbe. The operational amplifier OP regulates the virtual ground such that first and second terminal T+, T− stay at the voltage Vbe of first and second diode D1, D2.

Feedback loop FB arranges the current I1, I2 in the first and second transistors MN1, MN2 (here PMOS array) such as to render it equal to the sum of first and second currents Icp1, Icp2. As a result, the current I1, I2 (I1=I2) in the first and second transistors MN1, MN2 is given by $$I1 = I2 = Icp1 + Icp2 = \frac{V_{be}}{R_1} + \frac{V_T \ln A}{R_{ptat}}.$$

This current I1, I2 is mirrored by the first and second transistors MN1, MN2 into the reference path REF, i.e. into reference transistor MNref. Finally, the matched reference resistor Rref generates a reference voltage Vref whose value is given by $$V_{ref} = R_{ref} \cdot (Icp1 + Icp2) = V_{be} \cdot \frac{R_{ref}}{R_{vbe}} + V_T \frac{\ln A \cdot R_{ref}}{R_{ptat}}.$$

As this relationship is based on the ratio of matched resistors, the resulting thermal drift will be independent of the temperature sensitivity of these elements and only voltage Vbe and thermal voltage $V_T$, weighted by geometrical ratios (i.e. A and resistor ratios), determine the final thermal coefficient of the voltage reference Vref. A suitable relationship between the multiplying factors for both $V_T$ and Vbe ensures no thermal drift for reference voltage Vref. In other words, reference resistor Rref has no impact on the resulting thermal drift and, thus, can be set to any convenient resistance to provide the reference voltage Vref.

Moreover, as reference resistor Rref changes in the same way the weight of both opposite thermal contributions from first and second current Icp1, Icp2, the output reference voltage can be freely set by the choice of reference resistor Rref. The final thermal coefficient for the obtained reference voltage Vref is not altered by this choice. Thus, the proposed circuit allows for generating the reference voltage Vref within a flexible range utilizing an area saving design.

The implementation based on sharing first and second resistors R1, R2 terminated between first and second terminals T+, T− and reference terminal via intermediate resistor RN guarantees the same reference voltage Vref and the same power consumption even if using smaller resistors. If there was no connection from intermediate terminal TN via intermediate resistor RN to reference terminal GND first and second resistors R1, R2 would add their resistances to result in 2*Rvbe/N. The present principle reduces their value from a total of 2*Rvbe/N to [(N+3)/2N]*Rvbe/N which allows for a reduction equal to [(N+3)/4N]=(0.25+0.75/N). This saves a reasonable amount of space if integrated into an integrated circuit.

The operational amplifier OP regulates the virtual ground such that the first and second terminal T+, T− stay at the diode voltage Vbe of first and second diode D1, D2. Thus, implementing a resistor array by first and second resistors R1, R2 terminated between first and second terminals T+, T− and reference terminal GND via intermediate resistor RN does not lead to a short circuit. However, the operational amplifier OP may have a certain offset. This can be accounted for by setting the resistances of first and second resistors R1, R2 to an appropriate value and fit the resistance of the intermediate resistor RN accordingly. Monte Carlo simulations are of great help to determine a reasonable trade off between offset rejection and the amount of resistance Rvbe with respect to intermediate resistor RN.

We claim:

1. A reference circuit arrangement comprising:

a branched first current path connecting a first and second terminal via an intermediate terminal in which the intermediate terminal is connected to a reference terminal;

a second current path that splits into first and second current paths connecting the first terminal and the second terminal to the reference terminal, respectively, wherein the reference terminal is connected with a ground potential, and wherein the first and second current paths form a y-connection to the ground potential;

a feedback loop connected to the first and second terminal designed to control, at the first and second terminal, a virtual ground potential; and a reference path connected to the feedback loop having a reference input for receiving from the feedback loop a reference current and having a reference output to provide a reference voltage.

2. The reference circuit arrangement according to claim 1, wherein the branched first current path provides a first current having a first temperature coefficient, wherein the second current path provides a second current having a second temperature coefficient, wherein the feedback loop is designed to provide the reference current depending on the sum of the first and second current, and wherein the reference path generates the reference voltage depending on the reference current.

3. The reference circuit arrangement according to claim 1, wherein the branched current path comprises:

a matched pair of a first and second resistor connecting, in series, the first and second terminal via the intermediate terminal; and an intermediate resistor matched with the pair of the first and second resistor and connecting the intermediate terminal and to the reference terminal.

4. The reference circuit arrangement according to claim 3, wherein the intermediate resistor is matched to the pair of resistors having a resistance depending on the resistance of the matched pair of resistors.

5. The reference circuit arrangement according to claim 3, wherein the resistance $R_n$ of the intermediate resistor is given by $$R_n = \frac{(N-1)}{2} R_1 = \frac{(N-1)}{2} R_2,$$

in which N is an integer or real number equal or greater than 1, and $R_1$, $R_2$ denotes the resistance of the first and second resistor, respectively.

6. The reference circuit arrangement according to claim 1, wherein the second current path comprises a proportional-to-absolute-temperature resistor coupled between the first and second terminal via a first reference element and a second reference element each connected to the reference terminal.

7. The reference circuit arrangement according to claim 6, wherein a mismatched pair of diodes comprises the first reference element and second reference element.

8. The reference circuit arrangement according to claim 1, wherein the feedback loop comprises:

an operational amplifier connected via its non-inverting and inverting input to the first and second terminal, respectively;

a first and second transistor with their load sides being coupled to the supply terminal and connected to the non-inverting and inverting input of the operational amplifier, respectively; and the feedback output connected to the respective control side of the first and second transistor and connected to an output of the operational amplifier and the feedback output connected to the reference path.

9. The reference circuit arrangement according to claim 8, wherein the integer or real number N depends on the offset of the operational amplifier.

10. The reference circuit arrangement according to claim 1, wherein the reference path comprises a reference transistor connected, via its control side, to the feedback output, and connected, via its load side, between the supply terminal, the reference output and a reference resistor connected to the reference terminal.

11. A method for generating a reference voltage comprising:

providing a first current from a branched first current path connecting a first and a second terminal via an intermediate terminal, wherein the intermediate terminal is connected to a reference terminal connected with a ground potential;

providing a second current from a second current path that splits into first and second current paths connecting the first terminal and the second terminal to the reference terminal, respectively, wherein the reference terminal is connected with a ground potential, and wherein the first and second current paths form a y-connection to the ground potential;

controlling, at the first and second terminal, a virtual ground potential using a feedback loop; and generating a reference voltage depending on the first and second current.

12. The method according to claim 11, further comprising:

providing the first current with a first temperature coefficient;

providing the second current with a second temperature coefficient;

summing the first and second current using the feedback loop; and generating the reference voltage from a reference current corresponding to the sum of the first and second current.

13. The method according to claim 12, further comprising setting the first temperature coefficient and the second temperature coefficient such as to render the reference current independent of an ambient temperature.

* * * * *